United States Patent
Berthold et al.

(10) Patent No.: US 10,358,100 B2
(45) Date of Patent: Jul. 23, 2019

(54) BUMPER DEVICE FOR A VEHICLE

(71) Applicant: Bayerische Motoren Werke Aktiengesellschaft, Munich (DE)

(72) Inventors: Christian Berthold, Baierbach (DE); Wilhelm Riedl, Pfaffenhofen (DE)

(73) Assignee: Baerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/643,819

(22) Filed: Jul. 7, 2017

(65) Prior Publication Data
US 2017/0305373 A1   Oct. 26, 2017

Related U.S. Application Data

(63) Continuation of application No. PCT/EP2016/050249, filed on Jan. 8, 2016.

(30) Foreign Application Priority Data

Jan. 9, 2015 (DE) .......... 10 2015 200 199

(51) Int. Cl.
*B60R 19/02* (2006.01)
*B60R 19/12* (2006.01)
(Continued)

(52) U.S. Cl.
CPC .......... *B60R 19/12* (2013.01); *B60R 19/023* (2013.01); *B60R 19/24* (2013.01); *B60R 19/52* (2013.01);
(Continued)

(58) Field of Classification Search
CPC .......... B60R 19/12; B60R 19/52; B60R 19/18
(Continued)

(56) References Cited

U.S. PATENT DOCUMENTS

| | | | | |
|---|---|---|---|---|
| 4,902,059 A | * | 2/1990 | Tritton .................. | B60K 11/02 123/41.48 |
| 6,357,821 B1 | * | 3/2002 | Maj ...................... | B60Q 1/0035 296/193.09 |

(Continued)

FOREIGN PATENT DOCUMENTS

| | | |
|---|---|---|
| CN | 103707940 A | 4/2014 |
| DE | 20 2006 009 967 U1 | 8/2006 |

(Continued)

OTHER PUBLICATIONS

International Search Report (PCT/ISA/210) issued in PCT Application No. PCT/EP2016/050249 dated Apr. 1, 2016 with English translation (six pages).

(Continued)

*Primary Examiner* — Pinel E Romain
(74) *Attorney, Agent, or Firm* — Crowell & Moring LLP

(57) ABSTRACT

A bumper device for a motor vehicle has two bumper support members arranged parallel to the vehicle longitudinal center plane. The bumper device has a bumper crossmember arrangement arranged transversely with respect to the vehicle longitudinal center plane. The bumper crossmember arrangement has two fastening portions at which the bumper crossmember arrangement can be fastened to the associated bumper support member directly or by a respective connecting structure. A central portion between the fastening portions and two lateral end portions protrudes beyond the fastening portions. The central portion of the bumper crossmember arrangement is designed as a frame member surrounding an opening, with an upper crossmember, a lower crossmember, a left support post and a right support post.

12 Claims, 2 Drawing Sheets

(51) Int. Cl.
*B62D 25/08* (2006.01)
*B60R 19/24* (2006.01)
*B60R 19/52* (2006.01)

(52) U.S. Cl.
CPC ...... *B62D 25/085* (2013.01); *B60R 2019/527* (2013.01)

(58) Field of Classification Search
USPC .......................................................... 293/115
See application file for complete search history.

(56) References Cited

U.S. PATENT DOCUMENTS

| | | | | |
|---|---|---|---|---|
| 6,814,400 | B2* | 11/2004 | Henderson | B62D 29/001 180/68.4 |
| 6,945,576 | B1* | 9/2005 | Arentzen | B60K 13/02 180/68.3 |
| 7,399,027 | B2* | 7/2008 | Woodhouse | B60R 19/24 293/115 |
| 9,533,714 | B2* | 1/2017 | Riedl | B62D 25/084 |
| 9,623,824 | B2* | 4/2017 | Schneider | B60R 19/48 |
| 2007/0158962 | A1 | 7/2007 | Woodhouse et al. | |
| 2011/0169283 | A1* | 7/2011 | Salin | B60R 19/18 293/133 |
| 2013/0147217 | A1 | 6/2013 | Kim | |
| 2014/0091598 | A1 | 4/2014 | Park et al. | |
| 2017/0088074 | A1* | 3/2017 | Borghi | B60R 19/18 |
| 2018/0345784 | A1* | 12/2018 | Hammer | B60K 11/08 |

FOREIGN PATENT DOCUMENTS

| | | |
|---|---|---|
| DE | 10 2011 005 687 A1 | 9/2012 |
| DE | 10 2012 105 938 A1 | 6/2013 |
| DE | 10 2013 000 391 B4 | 3/2015 |
| EP | 1 300 322 A1 | 4/2003 |
| EP | 1 623 879 A1 | 2/2006 |
| WO | WO 03/008256 A1 | 1/2003 |
| WO | WO-2005049383 A1 * | 6/2005 ............. B60K 11/08 |

OTHER PUBLICATIONS

German-language Written Opinion (PCT/ISA/237) issued in PCT Application No. PCT/EP2016/050249 dated Apr. 1, 2016 (five pags).

German Search Report issued in counterpart German Application No. 10 2015 200 199.7 dated Oct. 19, 2015 with partial English translation (14 pages).

Chinese-language Office Action issued in counterpart Chinese Application No. 201680005164.0 dated Oct. 9, 2018 with English translation (22 pages).

Chinese-language Office Action issued in counterpart Chinese Application No. 201680005164.0 dated Apr. 17, 2019 with English translation (12 pages).

* cited by examiner

BUMPER DEVICE FOR A VEHICLE

CROSS REFERENCE TO RELATED APPLICATIONS

This application is a continuation of PCT International Application No. PCT/EP2016/050249, filed Jan. 8, 2016, which claims priority under 35 U.S.C. § 119 from German Patent Application No. 10 2015 200 199.7, filed Jan. 9, 2015, the entire disclosures of which are herein expressly incorporated by reference.

BACKGROUND AND SUMMARY OF THE INVENTION

The present invention relates to a vehicle having a bumper device, in particular having a front bumper device.

Conventional bumper devices for vehicles have a bumper crossmember arrangement extending transversely across the width of the vehicle. In particular in the case of low-profile vehicles with a vehicle front of low height in which the coolers are provided, such a bumper crossmember arrangement provided at the vehicle front constitutes a considerable obstruction for that part of the relative wind which forms a cooling air flow. This air mass flow intended for flowing through the cooler is divided or even blocked by the bumper crossmember arrangement extending in front of the coolers, such that the cooling air flow can flow through or impinge on the cooler or other components only in a suboptimum manner.

EP 1 300 322 A1 presents and describes a front module, formed from plastic, of a vehicle, which front module serves for holding various items which belong to the engine bay of a vehicle, as well as body parts, such as for example fenders, the engine hood or a front fascia. Such body and engine parts are fastened not to a bumper device but always to a front module which is connected to, or is a part of, the load-bearing structure of the vehicle. The crash structure of the vehicle, which also includes the bumper device, is always provided in front of said structure, and thus also in front of the front module.

WO 03/008256 A1 likewise presents and describes a front module for a motor vehicle, which front module serves for holding a multiplicity of elements thereon and, in order to facilitate the assembly of the motor vehicle, can be attached in prefabricated form, with elements attached thereto, to the motor vehicle. The front module may be produced for example from a composite material, such as for example a fiber-reinforced synthetic resin matrix with a core composed of balsa wood. The front module has a cooler grille opening reinforcement to which components, such as for example fenders, bumper covers, cooler grille, headlamps, etc. are attached. Proceeding forward in the direction of travel from the frame structure of said front module, there are provided components for holding headlamps, between which components there is situated a structure for local energy absorption in the event of pedestrian collisions, which structure is located in the upper region in front of the opening of the frame and is composed of the same plastics-wood composite material. In the case of said front module, too, it is always necessary for the crash structure of the vehicle, which also includes the bumper device, to be provided in front of the front module in the direction of travel.

EP 1 623 879 A1 presents and describes a frame structure of a front module, which likewise serves for accommodating vehicle components and does not form a bumper device. To each side of the structure of the front-end section there is attached a beam or member which is flexible and curved. The respective lateral member is inserted with a square peg into a square recess which is provided in each vertical member section of the frame-like front side. The respective beam or member serves for accommodating a front lamp unit and for fastening the front tip of a respective fender. The respective lateral members are connected to one another by means of an upper strut arrangement, wherein said strut arrangement extends with a forward surface section in front of the upper part of the opening of the frame. The strut arrangement may be composed of plastic, and is then thus not suitable as a bumper. The bumper skin is fastened to the two lateral members and to the strut arrangement. The front-end section thus constitutes merely a front module for accommodating the holder, formed by the lateral members and by the strut arrangements, for assemblies and body elements, in front of which there must still be provided a crash structure with a bumper device. It can also be seen that the bumper skin is completely closed in front of the opening of the front-end section.

DE 10 2011 005 687 A1 presents and describes a bumper of a motor vehicle, which bumper is composed of two lateral bumper crossmember sections and of a central bumper crossmember section which connects said lateral bumper crossmember sections to one another. The bumper crossmember sections are produced from light metal extruded profiles. For weight reasons, the central extruded profile has a cutout. All three bumper crossmember sections have the same height, such that the central bumper crossmember section does not extend over a greater vertical height than the lateral bumper crossmember sections. The bumper crossmember sections thus extend over approximately the same height extent over the width of the motor vehicle. The bumper support members are attached above the cutout provided in the central section, specifically to the upper region of the central bumper crossmember section.

It is the object of the present invention to specify a vehicle having a bumper device which, even in the case of a vehicle front of low height, permits an improved flow through coolers provided in the vehicle front.

This object is achieved by a vehicle according to the invention having a bumper device and having two bumper support members arranged parallel to the vehicle longitudinal central plane. The bumper device has a bumper crossmember arrangement which is arranged transversely with respect to the vehicle longitudinal central plane and which is equipped with two fastening sections and which has a central section and two lateral end sections. The bumper crossmember arrangement is fastened by its two fastening sections directly or by a respective connecting structure to the associated bumper support member. The central section of the bumper crossmember arrangement is formed as a frame member which surrounds an opening and which has an upper crossmember, a lower crossmember, a left-hand support pillar and a right-hand support pillar. The central section is provided between the fastening sections, and the two lateral end sections projecting laterally beyond the fastening sections. The clear width between the upper and the lower crossmember is greater than or equal to the height extent of the bumper support members. The bumper device is designed such that inflowing cooling air can flow substantially unimpeded through the opening, which is surrounded by the frame member, to a cooler situated downstream of the bumper device.

This refinement according to the invention of a vehicle having a bumper device with, as a central section, a frame member which surrounds an opening, makes it possible for the one or more coolers to be positioned behind the opening of the frame member, in such a way that a throughflow is possible without parts of the bumper device causing shielding effects. The frame member, with its upper crossmember and its lower crossmember in the central section, performs the tasks of the bumper crossmember. In this way, a frame member with a correspondingly large opening is realized, which permits the passage of an adequately large coolant flow.

It is particularly preferable for the clear width between the upper and the lower crossmember to be approximately twice the height extent of the bumper support members. For example, the clear width amounts to 2.5 times the height extent of the bumper support members. The clear width between the upper and the lower crossmember may however also be less than twice the height extent of the bumper support members, and may, for example, amount to 1.5 times the height extent.

It is preferable for a grille to be provided in or in front of the opening of the frame member. The grille may form a protective grille for the one or more coolers situated behind the opening.

Alternatively, to protect the cooler, a cable or bar arrangement may be provided in or in front of the opening of the frame member. Here, it is advantageous if the cable or bar arrangement has cables or bars running parallel to the lower and/or upper crossmember. The transversely running cables or bars can, in the event of a collision, accommodate transverse forces that act in the bumper device.

In an alternative embodiment, the cable or rod arrangement may have cables or rods running transversely, in particular at right angles, with respect to the lower and/or upper crossmember.

It is also preferably possible for a lamellar arrangement to be provided in or in front of the opening of the frame member. Here, it is advantageous if the lamellar arrangement has lamellae running parallel to the lower and/or upper crossmember. Alternatively, the lamellar arrangement may have lamellae running at right angles with respect to the lower and/or upper crossmember.

In an advantageous refinement of the bumper device according to the invention, between the left-hand support pillar and the right-hand support pillar, there is provided at least one further support pillar which connects the upper crossmember and the lower crossmember to one another. The at least one further support pillar improves the statics of the frame member, whereby in particular, even in the event of a collision, the risk of an ingress of foreign bodies into the opening of the frame member, and thus of damage to the cooler, is reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
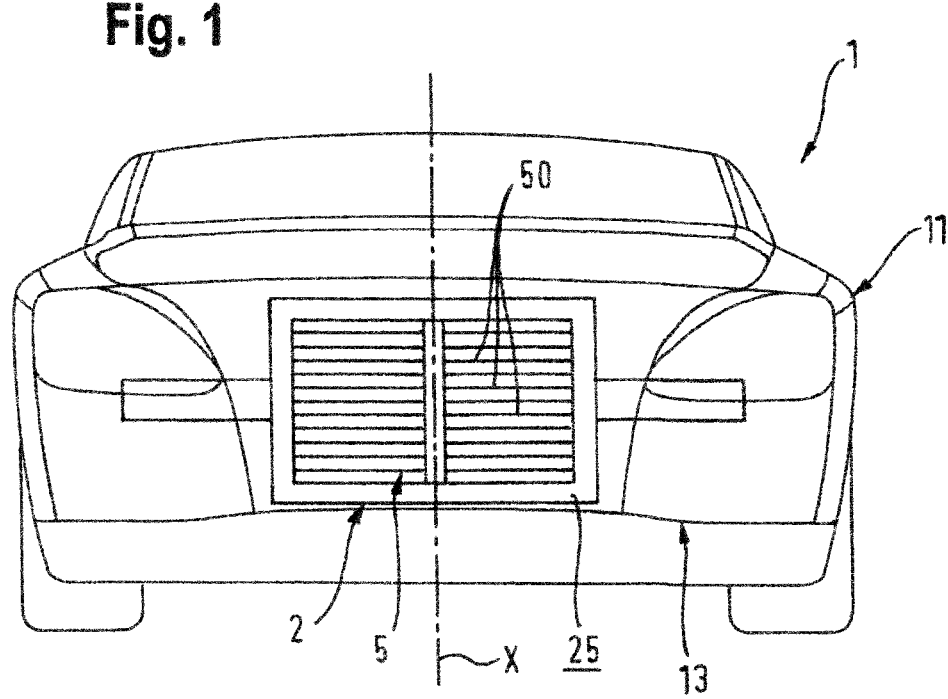
FIG. 1 is a front view of a vehicle equipped with a bumper device according to an embodiment of the invention.

FIG. 1 schematically illustrates the front view of a vehicle 1 with a bumper device 2. The bumper device 2 is concealed behind a vehicle front paneling 13, which is part of the vehicle body 11. To make the structure and arrangement of the bumper device 2 more clearly identifiable, the bumper device has been illustrated in FIG. 1 using solid lines even though it is situated behind the vehicle front paneling 13 and is thus not visible from the outside.

The bumper device 2 has a bumper crossmember arrangement 20 which is arranged transversely with respect to the vertical vehicle longitudinal central plane X and which will be described in more detail below in conjunction with FIG. 2.

Figure 2:
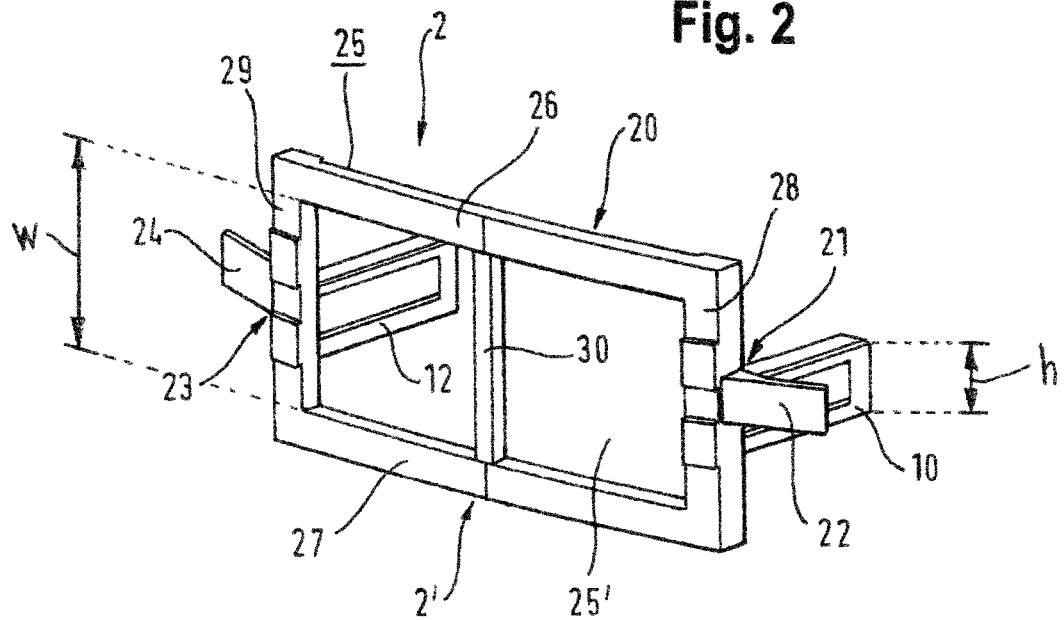
FIG. 2 is a perspective view of a schematically depicted embodiment of a bumper device according to the invention, isolated from the vehicle.

The bumper crossmember arrangement 20, schematically illustrated in FIG. 2, of the bumper device 2 has two fastening sections 21, 23, by which the bumper device 2 can be fastened in each case, directly or indirectly through the provision of additional crash boxes (not shown), to a bumper support member 10, 12 which is connected to or formed integrally with the vehicle body. Via the fastening sections 21, 23 and the bumper support members 10, 12, forces acting on the bumper device 2 in the event of a collision are transmitted into the vehicle structure.

Between the two fastening sections 21, 23 of the bumper device 2, there is provided a central section 2' of the bumper crossmember arrangement 20. The central section is in the form of a frame member 25. The frame member 25 is composed substantially of a left-hand support pillar 28 and a right-hand support pillar 29, in or on which the respective fastening section 21, 23 is formed, and of an upper crossmember 26 and a lower crossmember 27, which are connected to the support pillars 28, 29 and which form a closed frame profile of the frame member 25. The frame profile encloses an opening 25' through which cooling air can flow in substantially unimpeded fashion to the coolers (not shown) of the vehicle which are situated behind the bumper device 2.

The clear width w between the upper crossmember 26 and the lower crossmember 27 is greater than the height extent h of the bumper support members 10, 12. As already mentioned above, it is hereby made possible for the cooling air to flow in substantially unimpeded fashion through the opening 25' of the frame member 25 to the coolers (not illustrated) situated behind the bumper device 2. In the present exemplary embodiment, the clear width w amounts to approximately 2.5 times the height extent h of the bumper support members 10, 12. It is self-evidently also possible for the clear width w to deviate from said value. For an adequate through flow of cooling air, the clear width w between the upper crossmember 26 and the lower crossmember 27 is, however, at least as great as the height extent h of the bumper support members 10, 12.

In the center of the frame member 25, between the left-hand support pillar 28 and the right-hand support pillar 29, an optional further vertical support pillar 30 is provided in order to stiffen the frame member 25. The further vertical support pillar connects the upper crossmember 26 and the lower crossmember 27 to one another.

A left-hand lateral end section 22 and a right-hand lateral end section 24 of the bumper crossmember arrangement 20 extend in the conventional manner from the vertical support pillars 28, 29 to the respective vehicle outer side, for example proceeding approximately from the center of the respective support pillar 28, 29.

Figure 3:
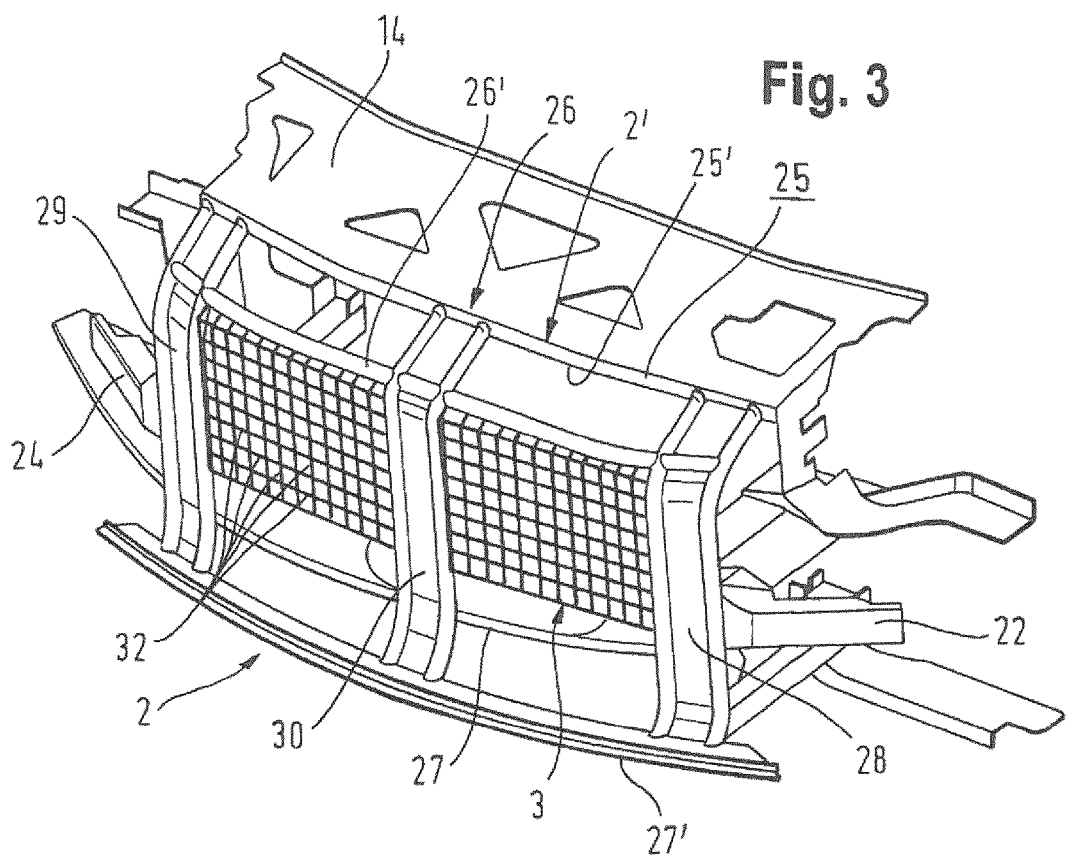
FIG. 3 is a first embodiment of a bumper device according to the invention, connected to the front body structure of a vehicle.

FIG. 3 illustrates a structural embodiment of a vehicle front with an integrated bumper device 2, wherein here, the same reference designations as in FIG. 2 are used to denote the same components. The upper crossmember 26 is formed by a front structure part 14 of the vehicle body 11 and by an upper auxiliary crossmember 26'. A grille 3 as part of the bumper device 2 is provided in front of the opening 25' of the frame member 25, which grille prevents the ingress of relatively large foreign bodies through the opening 25 and thus protects the coolers (not shown) situated behind said opening against damage. The grille 3 is composed of grille bars or grille wires 32 which are of very thin cross section, and thus does not constitute an unduly great flow obstruction for the relative wind, such that the cooling airflow through the opening 25' is not impeded to a relevant extent.

In the example shown in FIG. 3, the vertically running pillars 28, 29 and 30 project downward beyond the lower crossmember 27 and are connected to one another by an auxiliary member 27' which runs in the vehicle transverse direction, and which serves, for example, for supporting the lower part of the vehicle front paneling 13 of the vehicle body 11.

Figure 4:
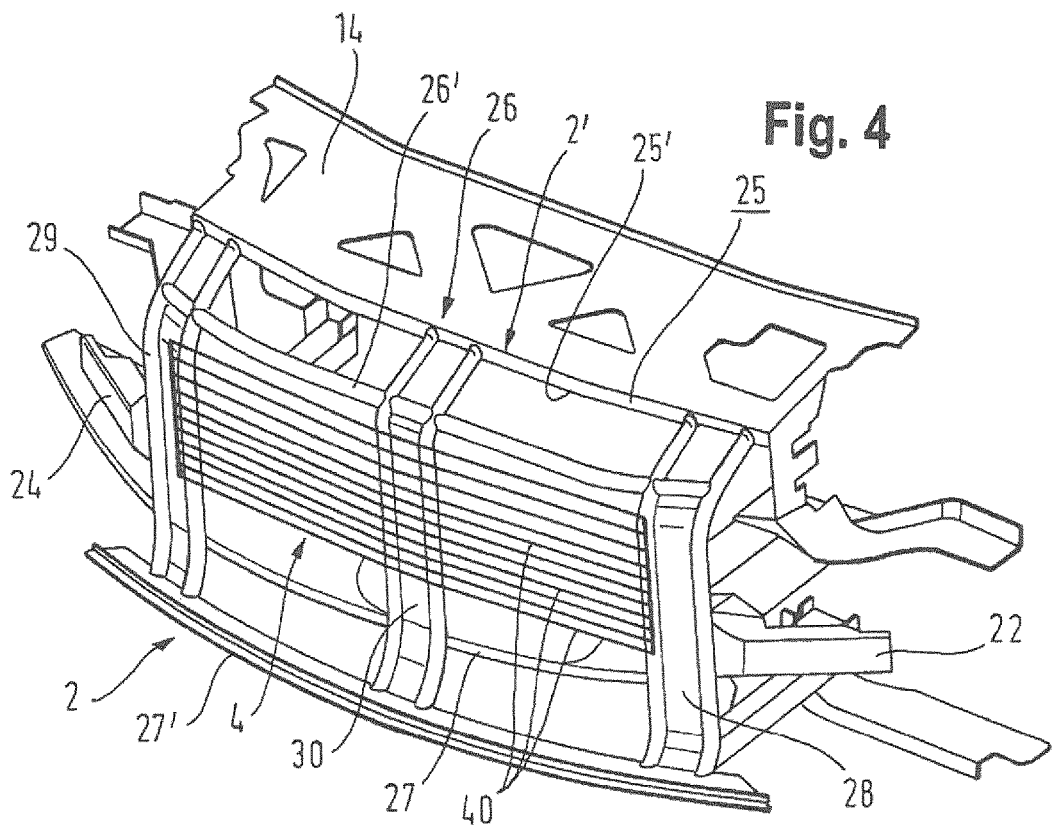
FIG. 4 is a second, alternative embodiment of a bumper device according to the invention, connected to the front body structure of a vehicle.

An alternative embodiment of the bumper device shown in FIG. 3 is illustrated in FIG. 4. Here, the bumper device 2 is constructed in the same way as in the example of FIG. 3, such that in this case, too, the same reference designations are used to denote the same components. In the example of FIG. 4, it is merely the case that, instead of the grille 3, a cable or bar arrangement 4 is provided which has a multiplicity of cables 40 or bars running parallel to the upper crossmember 26 and parallel to the lower crossmember 27. The cables 40 or bars are of such a thin cross section that they likewise do not constitute a major obstruction for the cooling air flow, but prevent the ingress of relatively large foreign bodies through the opening 25'. Instead of the horizontal arrangement of the cables 40 shown in FIG. 4, the cables or the bars may also run transversely with respect to the upper and/or lower crossmember 26, 27, in particular vertically.

Instead of the grille 3 illustrated in FIG. 3 or the cable or bar arrangement 4 illustrated in FIG. 4, it is also possible for a lamellar arrangement 5 to be provided in or in front of the opening 25' of the frame member 25, as is schematically illustrated in FIG. 1. The lamellar arrangement 5 has a multiplicity of lamellae 50 which run transversely in the example shown in FIG. 1 but which may also run vertically. The illustrated arrangement with transversely or horizontally running lamellae 50 is however preferably realized. The lamellae 50 may be arranged rigidly in the frame member 25, though they may also be arranged so as to be pivotable in the manner of a louver and be actuable by a drive and control device, for example in order to be able to regulate the volume flow of the cooling air flow passing through the opening 25'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a bumper device beam, comprising:
two bumper support members arranged parallel to the vehicle longitudinal central plane;
a bumper crossmember arrangement which is arranged transversely with respect to the vehicle longitudinal central plane and which is equipped with two fastening sections and which has a central section and two lateral end sections, wherein
the bumper crossmember arrangement is fastened by the two fastening sections directly or by a respective connecting structure to an associated bumper support member,
the central section of the bumper crossmember arrangement is formed as a frame member which surrounds an opening and which has an upper crossmember, a lower crossmember, a left-hand support pillar and a right-hand support pillar,
the central section is provided between the fastening sections, and the two lateral end sections project laterally beyond the fastening sections,
a clear width between the upper and the lower crossmember is greater than or equal to a height extent of the bumper support members, and
the bumper crossmember arrangement is configured such that inflowing cooling air flows substantially unimpeded through the opening, which is surrounded by the frame member, to a cooler situated downstream of the bumper crossmember arrangement.

2. The vehicle as claimed in claim 1, wherein
the clear width between the upper and the lower crossmember amounts to approximately 1.5 times the height extent of the bumper support members.

3. The vehicle as claimed in claim 1, wherein
the clear width between the upper and the lower crossmember amounts to approximately 2 times the height extent of the bumper support members.

4. The vehicle as claimed in claim 1, wherein
the clear width between the upper and the lower crossmember amounts to approximately 2.5 times the height extent of the bumper support members.

5. The vehicle as claimed in claim 1, further comprising:
a grille in or in front of the opening of the frame member.

6. The vehicle as claimed in claim 1, further comprising:
a cable or bar arrangement in or in front of the opening of the frame member.

7. The vehicle as claimed in claim 6, wherein
the cable or bar arrangement has cables or bars running parallel to the lower and/or upper crossmember.

8. The vehicle as claimed in claim 6, wherein
the cable or bar arrangement has cables or bars running transversely with respect to the lower and/or upper crossmember.

9. The vehicle as claimed in claim 1, further comprising:
a lamellar arrangement in or in front of the opening of the frame member.

10. The vehicle as claimed in claim 9, wherein
the lamellar arrangement has lamellae running parallel to the lower and/or upper crossmember.

11. The vehicle as claimed in claim 9, wherein
the lamellar arrangement has lamellae running at right angles with respect to the lower and/or upper crossmember.

12. The vehicle as claimed in claim 1, wherein
between the left-hand support pillar and the right-hand support pillar, at least one further support pillar connects the upper crossmember and the lower crossmember to one another.

* * * * *